United States Patent [19]
Augustsson et al.

[11] Patent Number: 6,005,992
[45] Date of Patent: Dec. 21, 1999

[54] OPTICAL DEVICE

[75] Inventors: Torsten Augustsson, Upplands Väsby; Jean-Pierre Weber, deceased, late of Solna, both of Sweden; by Paul Weber, legal representative, Overijse, Belgium

[73] Assignee: Telefonaktiebolaget LM Ericsson, Stockholm, Sweden

[21] Appl. No.: 09/032,946

[22] Filed: Mar. 2, 1998

[30] Foreign Application Priority Data

Mar. 7, 1997 [SE] Sweden .................................. 9700865

[51] Int. Cl.$^6$ ....................................................... G02B 6/10
[52] U.S. Cl. ................................ 385/16; 385/20; 385/3; 385/10
[58] Field of Search .................................. 385/16, 17, 20, 385/21, 3, 8, 9, 10

[56] References Cited

U.S. PATENT DOCUMENTS

| | | | |
|---|---|---|---|
| 5,295,205 | 3/1994 | Miller et al. .................................. | 385/1 |
| 5,448,390 | 9/1995 | Tsuchiya et al. ........................ | 359/132 |
| 5,636,309 | 6/1997 | Henry et al. .............................. | 385/129 |
| 5,889,906 | 3/1999 | Chen ........................................... | 385/28 |
| 5,933,554 | 8/1999 | Leuthold et al. ........................... | 385/28 |

FOREIGN PATENT DOCUMENTS

| | | |
|---|---|---|
| 2038461A | 6/1997 | United Kingdom . |
| 2308252A | 6/1997 | United Kingdom . |

OTHER PUBLICATIONS

"Wavelength Division Multiplexer with Photoinduced Bragg Gratings Fabricated in a Planar–Lightwave–Circuit–Type Asymmetric Mach–Zehnder Interferometer on Si", IEEE Photonics Technology Letters, vol. 8, No. 1, Jan. 1996.

"Optical Multi–Mode Interference Devices Based on Self–Imaging: Principles and Applications", Journal of Lightwave Technology, vol. 13, No. 4, Apr. 1995.

*Primary Examiner*—Hung N. Ngo
*Attorney, Agent, or Firm*—Burns, Doane, Swecker & Mathis, L.L.P.

[57] ABSTRACT

The present invention relates to a wavelength selective switch. Said switch comprises at least one MMI waveguide, at least one Mach Zehnder waveguide, at least one phase control element and at least one Bragg grating, where said Mach Zehnder waveguide comprises said phase control element and said Bragg grating and is arranged in connection to at least one MMI waveguide. The invention further comprises a method for switching wavelength channels by using the above mentioned wavelength selective switch.

21 Claims, 2 Drawing Sheets

OPTICAL DEVICE

TECHNICAL FIELD

The present invention relates to an optical wavelength selective device, and more specifically to a wavelength selective switch for redirecting wavelength channels in an optical network, where each wavelength channel may be redirected individually. The invention also comprises a method for switching or add/drop multiplexing of wavelength channels in an optical network.

STATE OF THE ART

A number of different methods are known to further increase the capacity in existing optical networks. One way is to use so called wavelength division multiplexing (WDM) technology to improve the degree of utilization of the available bandwidth on an optical fibre in the optical network. To increase the flexibility of the network, devices that can perform the redirection of traffic in the optical network are needed. The forementioned devices for the redirection of traffic can also help in using the network as efficiently as possible, and in case of a break in the network.

In "Wavelength Division Multiplexer with Photoinduced Bragg Gratings Fabricated in a Planar Lightwave Circuit Type Asymmetric Mach Zehnder Interferometer on Si", Y. Hibino et. al., an optical element is described in which Bragg grating and phase control elements are used in a Mach Zehnder interferometer. The intended applications are wavelength division multiplexing and wavelength division demultiplexing.

The apparatus mentioned above however cannot be used as a wavelength selective switch. If the above mentioned apparatus is to be used for add/drop of several channels the same number of apparatuses as the number of handled add/drop pairs are needed. This type of apparatus is relatively difficult to reconfigure, that is, it is inflexible.

One problem with wavelength selective switches according to the prior art is that they require very big and complicated structures or several components, which results in large power losses and high costs.

SUMMARY OF THE INVENTION

A number of known methods can be used to increase the capacity in an optical transmission system. In e.g. wavelength division multiplexing transmission channels are multiplexed and demultiplexed on different carrier wavelengths onto, resp. out from, an information flow. This multiplexing and demultiplexing requires optically wavelength selective devices. It may also be desirable to change the route of transmission through the optical network for certain wavelength channels. For this purpose components with wavelength selective properties are required, for example in the form of a wavelength selective switch.

One problem with known wavelength selective switches is that they contribute to large power losses.

Another problem is that known wavelength selective switches have a relatively complex structure and, in all the cases known to us, a relatively large number of different components.

A further problem is that known wavelength selective switches are relatively expensive to manufacture because of the above mentioned complex structure and the large number of components.

The present invention approaches the above mentioned problems by a wavelength selective switch comprising at least one MMI (Multi Mode Interference) structure, at least one Bragg grating, at least one Mach Zehnder waveguide and at least one phase control element.

The above mentioned MMI structure is used for splitting up light. The distribution of light intensity at one of the inputs of the MMI structure is depicted on all outlets of the MMI structure when its length is selected correctly. A deeper theory behind this is found in L. B. Soldano and E. C. M. Pennings, "Optical Multi Mode Interference Devices Based on Self Imaging: Principles and Application", J. Lightwave Technology. Vol. 13(4), pp 615–627, 1995.

A Bragg grating is used filtering light. Filtering means that certain wavelengths are allowed to pass while other are reflected. The Bragg grating can be said to constitute a kind of wavelength selective mirror. Said reflection of certain wavelengths can be achieved in a number of ways; common to most of these methods is that the reflection is achieved by periodically changing the index of the substance in the waveguide.

The above mentioned phase control element is needed for certain switching functions and for the correction of process imperfections. There are several types of phase control elements; fundamental for all of them however is that the optical wavelength is affected through an applied external signal (voltage, current, light or heat). Usually a so called thermo-optical element is used, that is, the refractive index and thereby the wavelength, is affected by means of heat.

The wavelength selective switch according to the invention may comprise MMI waveguides at both its connection sides. Said MMI waveguides can on their free sides comprise a number of inputs consisting, for example, of so called access waveguides for optical signals. Between said MMI waveguides a number of Mach Zehnder waveguides are arranged. These Mach Zehnder waveguides in turn comprise a number of phase control elements and a number of Bragg gratings. The number of phase control elements may be one more than the number of Bragg gratings in the cases when one only wants to control any transmitted wavelength channels. In the case when only reflected wavelength channels are of interest, the number of phase control elements and Bragg gratings may be the same. The number of Bragg gratings and phase control elements may be equivalent for each Mach Zehnder waveguide. Each Mach Zehnder waveguide comprising said phase control elements and Bragg gratings may be identical.

By adjusting the shape and the dimension of the MMI waveguide and the length of the Mach Zehnder waveguides one can, by means of suitable phase control elements direct an optical signal from an input on the first MMI waveguide to an arbitrary output on the second MMI waveguide.

The object of the present invention is to achieve a wavelength selective switch which by its structure is as simple and as compact as possible so that the manufacturing cost may thus be reduced compared to the prior art technology.

An advantage of the present invention is that the power loss may be kept relatively low.

Another advantage of the present invention is that its performance in other areas such as crosstalk and the like may be improved compared to prior art.

The invention will now be described in more detail by means of preferred embodiments and with reference to the enclosed drawings.

DESCRIPTION OF PREFERRED EMBODIMENTS

Figure 1:
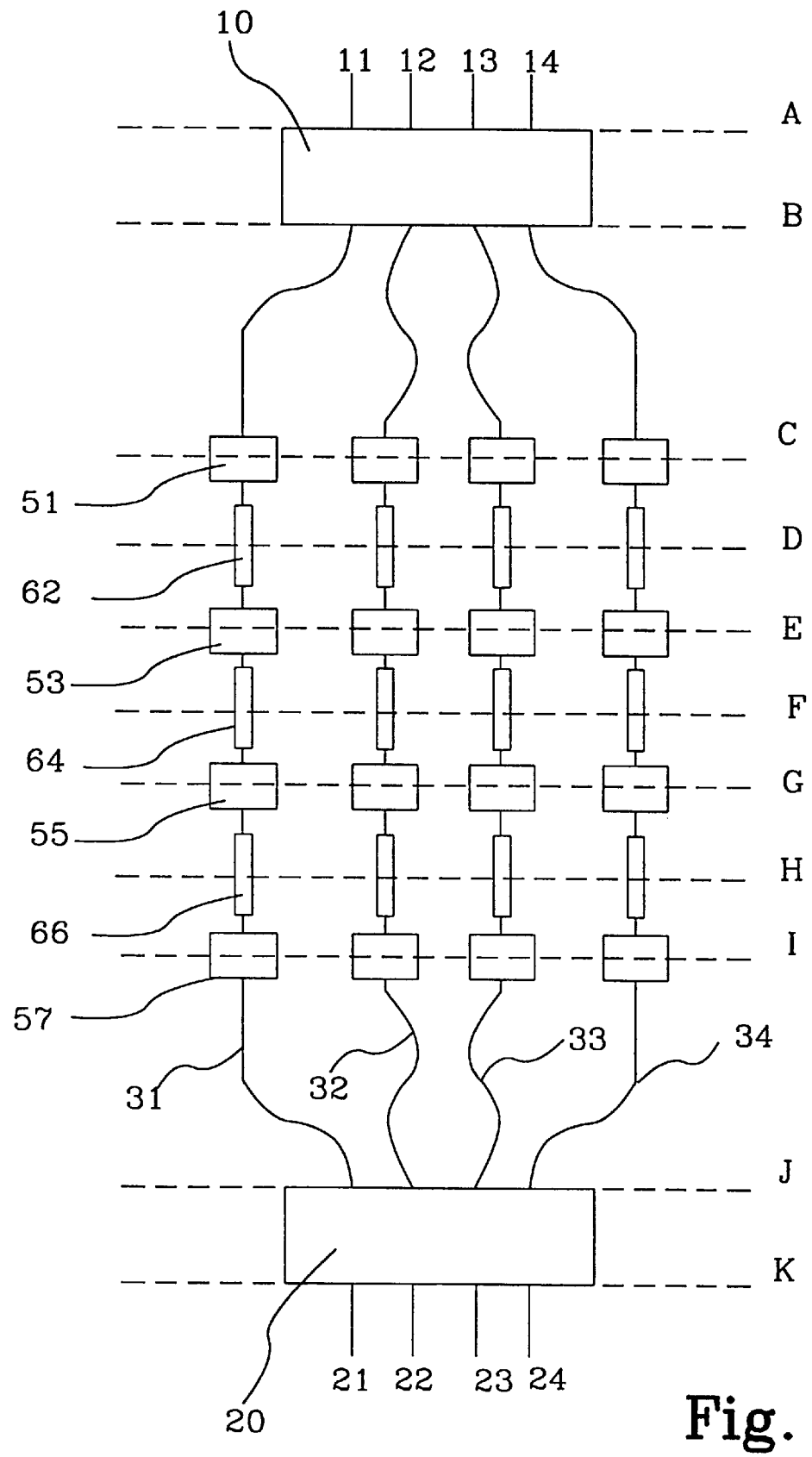
FIG. 1 shows an embodiment of a wavelength selective switch according to the invention.

In FIG. 1 a wavelength selective switch according to the invention is shown. The support lines A–K show sections used to describe the invention. In this embodiment the wavelength selective switch can handle four different wavelengths independently of each other. At the first connection end of the wavelength selective switch a first MMI waveguide is arranged and at the other connection end of the wavelength selective switch a second MMI waveguide 20 is arranged. The first MMI waveguide 10 in this embodiment comprises one or more access waveguides 11, 12, 13, 14 and the second MMI waveguide 20 comprises one or more access waveguides 21, 22, 23, 24. Between the first MMI waveguide 10 and the second MMI waveguide 20 four so called Mach Zehnder waveguides 31, 32, 33, 34 are arranged. Each of the above mentioned Mach Zehnder waveguides comprises four phase control elements 51, 53, 55, 57 and three Bragg gratings 62, 64, 66.

The above mentioned wavelength selective switch of course may be upgraded to comprise N wavelength channels instead of the four wavelength channels shown in the above mentioned embodiment. Generally however, in order for the wavelength selective switch to be able to handle N wavelength channels independently of each other, it must comprise Nx(N-1) Bragg gratings, $N^2$ phase control elements and N access waveguides, each arranged in connection to an MMI waveguide.

Suppose that light is excited onto the access waveguide 11 belonging to the MMI waveguide 10 at section A. The length of the MMI waveguide 10 is selected so that N images of the light intensity from the access waveguide 11 at section A are achieved in the MMI waveguide 10 along section B. Next suppose that the structure and dimensions of the MMI waveguide 10 have been selected so that four images, that is N=4, of the original distribution in the access waveguide are achieved. If the access waveguides 11, 12, 13, 14 have been arranged at the MMI waveguide 10 in a correct way, that is, if they have been positioned correctly, and if the cross-sectional dimension and positioning of the Mach Zehnder arms 31, 32, 33, 34 have been chosen correctly, a large fraction of the energy in the images will be connected to the Mach Zehnder waveguides 31, 32, 33, 34. The maximum energy of these images is <1/N of the energy along section A if perfect uniformity is achieved, that is, in this case <¼ of the energy along section A. This intensity distribution will differ very little if light is instead excited from any of the access waveguides 12–14 along section A.

In contrast, the phase relationship is strongly dependent on the access waveguide at which light is excited into the MMI waveguide. This input access waveguide dependent phase relationship is the key to the functionality of the component. Because of reciprocity, light with the corresponding phase relationship at section B travelling in the reverse direction, that is, from the bottom upwards according to FIG. 1, will be focused on the corresponding access waveguides.

Sections along the support lines D, F and H denote Bragg grating sections. The Bragg gratings along each support line may be identical. If they are identical the grating sections will reflect the wavelength along the corresponding support line for each of the Mach Zehnder waveguides 31, 32, 33, 34. The wavelengths that are reflected return to the MMI 10 with the phase relationship determined by the phase control elements 51, 53, 55.

Suppose, for example, that the Bragg gratings along section D reflect a wavelength λ1, and the Bragg gratings along section F reflect a wavelength λ2; the phase control elements 51 along section C will then determine which access waveguide 11–14 will be the output for the wavelength λ2. The analogous situation is seen along section G, that is, the phase control element 55 along said section G determine which one of the access waveguides 11–14 will be the output for the wavelength λ3, which has been reflected by the Bragg gratings along section H.

The phase relationship onto the MMI waveguide 10 in the reverse direction can thus be selected individually for each wavelength, that is, each wavelength channel can be assigned an output independently of other wavelength channels. This of course implies that, for example, the phase control element 53 along section E can compensate for the phase control element 51 along section C and that the phase control element 55 along section G can compensate for the phase control elements 51, 53 along sections C and E respectively, and that the phase control element 57 along section I can compensate for the phase control elements 51, 53, 55 along the sections C, E and G respectively. In general, each phase control element must be able to compensate for the phase control elements arranged before it in the transmission route of the channels along the same Mach Zehnder waveguide.

Of course the phase control element 51 along the support line C also affects the wavelength channels λ2, λ3 and λ4. This compensation can, however, easily be software controlled according to teachings known to a person skilled in the art, and, therefore, will not be described in detail here. There is also the possibility, if said compensation is not desired to be software controlled, to extend the phase control elements 51, 53, 55, 57 successively from section C in the direction towards section I in a suitable manner.

The wavelength channel or channels not reflected by a Bragg grating will reach the MMI 20 and the phase relationship along support line J will determine to which output along support line K the respective wavelength channel is excited. If length of the Mach Zehnder waveguides 31, 32, 33, 34 are equivalent the wave length channels that reach the MMI 20 will be focused on the same output. The difference in length between the Mach Zehnder waveguides 31, 32, 33, 34 can also be selected so that different wavelengths that reach the MMI 10 are focused on different access waveguides 21, 22, 23, 24 along the support line K.

Figure 2:
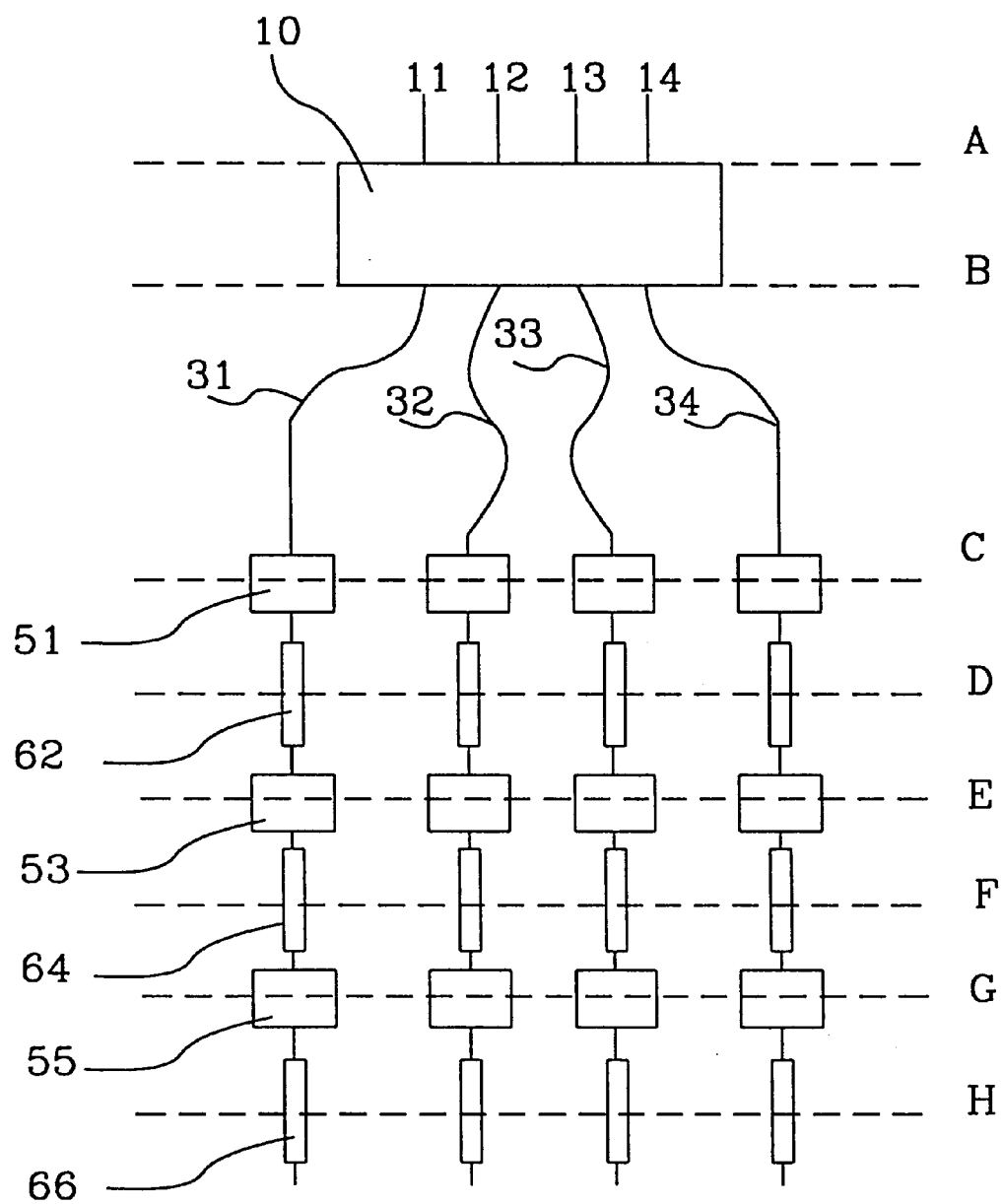
FIG. 2 shows a second embodiment of a wavelength selective switch according to the invention.

In FIG. 2 another embodiment of a wavelength selective switch according to the invention is shown. The support lines A–H show sections used to describe the invention. This embodiment comprises an MMI waveguide 10 and four Mach Zehnder waveguides 31, 32, 33, 34. On one side of the MMI waveguide 10 four access waveguides 11, 12, 13, 14 are arranged. On the opposite side relative to said access waveguides, said Mach Zehnder waveguides 31, 32, 33, 34 are arranged. On each of these Mach Zehnder waveguides 31, 32, 33, 34 three Bragg gratings 62, 64, 66 and three phase control elements 51, 53, 55 are arranged.

Suppose that a wavelength channel is sent to an access waveguide 11 arranged on the MMI waveguide 10. This wavelength channel passes through the MMI waveguide. The length and the structure of the MMI waveguide are selected so that N images of the light intensity from the access waveguide 11 at section A are achieved in the MMI waveguide along section B. In this case, suppose that the length and the structure have been selected so that four images are achieved. If the access waveguides 11, 12, 13, 14 have been arranged at the MMI waveguide 10 in a correct way, that is, if they have been positioned correctly, and if the cross-sectional dimension and positioning of the Mach Zehnder waveguides 31, 32, 33, 34 have been chosen correctly, a large fraction of the energy in the images will be connected to the Mach Zehnder waveguides 31, 32, 33, 34. The maximum energy for these images is <1/N of the energy along section A if perfect uniformity is achieved, that is, in this case <¼ of the energy along section A. This intensity distribution will differ very little if light is instead excited from any of the access waveguides 12–14 along section A.

The phase relationships on the other hand depend strongly on at which of the access waveguides light is excited onto the MMI waveguide. This input access waveguide dependent phase relation is the key to the functionality of the component. Because of reciprocity, light with the corresponding phase relationship at section B travelling in the reverse direction, that is from the bottom upwards according to FIG. 2, will be focused on the corresponding access waveguide.

Sections along the support lines D, F and H denote Bragg grating sections. The Bragg gratings along each support line may be identical. If they are identical the grating sections will reflect the wavelength along the corresponding support line for each of the Mach Zehnder waveguides 31, 32, 33, 34. The wavelengths which are reflected return to the MMI 10 with the phase relationship determined by the phase control elements 51, 53, 55.

Suppose, for example, that the Bragg gratings along section D reflect the wavelength $\lambda 1$, and that the Bragg gratings along section F reflect the wavelength $\lambda 2$; then the phase control elements 51 along section C will determine which access waveguide 11–14 will be the output of, for example, a wavelength $\lambda 1$, the phase control elements 53 along section E will determine which access waveguide 11–14 will be the output of, for example, a wavelength $\lambda 2$. The analogous situation is seen along section G, that is, the relevant phase control element 55 along said section will determine which one of the access waveguides 11–14 will be the output of the wavelength $\lambda 3$, which has been reflected by the Bragg gratings along section H.

The phase relationship onto the MMI waveguide 10 in the reverse direction may thus be selected individually for each wavelength, that is, each wavelength channel may be assigned an output independently of other wavelength channels. This of course implies that, for example, the phase control element 53 along section E can compensate for the phase control element 51 along section C and that the phase control element 53 along section G can compensate for the phase control elements 51, 53 along sections C and E respectively. In general each phase control element is to be able to compensate for the phase control elements arranged before it in the transmission path of the channels along the same Mach Zehnder waveguide.

It is of course also the case that the phase control element 51 along the support line C also affects the wavelength channels $\lambda 2$, $\lambda 3$ and $\lambda 4$. This compensation can, however, easily be software controlled according to theories well known to the person skilled in the art, and thus will not need to be described in more detail here. There is also the possibility, if said compensation is not desired to be software controlled, to extend the phase control elements 51, 53, 55 from section C in the direction towards section G successively in a suitable manner.

The wavelength channel or channels which are not reflected by any Bragg grating will be excited from the relevant Mach Zehnder waveguide 31, 32, 33, 34.

The materials that may be suitable for manufacturing of the present invention are, for example, quartz ($SiO_2$), polymers, lithium niobate ($LiNbO_3$) or a semiconductor system.

The invention is of course not limited to the embodiments described above and shown in the drawings, but may be modified within the scope of the appended patent claims.

We claim:

1. Wavelength selective switch for switching optical wavelength channels, characterized in that it comprises at least one MMI waveguide (10, 20), at least two Mach Zehnder waveguides (31, 32, 33, 34), at least one Bragg grating (62, 64, 66) for each Mach Zehnder waveguide and at least one phase control element (51, 53, 55, 57), where said Mach Zehnder waveguides comprise said phase control element and said Bragg grating and are arranged in connection to at least one MMI waveguide (10, 20).

2. Wavelength selective switch according to claim 1, characterized in that one or more access waveguides (11, 12, 13, 14) are arranged on at least one of the free contact sides of the MMI waveguides (10, 20).

3. Wavelength selective switch according to claim 2, characterized in that the number of access waveguides (11, 12, 13, 14) arranged on at least one of the MMI waveguides (10,20) and the number of Mach Zehnder waveguides (31, 32, 33, 34) are equal.

4. Wavelength selective switch according to claim 2, characterized in that the number of access waveguides (11, 12, 13, 14) arranged on at least one of the MMI waveguides (10, 20) and the number of Mach Zehnder waveguides (31, 32, 33, 34) are not equal.

5. Wavelength selective switch according to claim 3, characterized in that the Mach Zehnder waveguides (31, 32, 33, 34) are arranged between an first (10) and a second (20) MMI waveguide.

6. Wavelength selective switch according to claim 5, characterized in that the dimensions and the structures of the first (10) and the second (20) MMI waveguide are equivalent.

7. Wavelength selective switch according to claim 5, characterized in that the dimensions and the structures of the first (10) and the second (20) MMI waveguides are different.

8. Wavelength selective switch according to claim 6, characterized in that at least one Mach Zehnder waveguide (31, 32, 33, 34) comprises N phase control elements (51, 53, 55, 57) and N−1 Bragg gratings (62, 64, 66).

9. Wavelength selective switch according to claim 8, characterized in that the Mach Zehnder waveguides (31, 32, 33, 34) are of identical length.

10. Wavelength selective switch according to claim 8, characterized in that the length of at least one Mach Zehnder waveguide (31, 32, 33, 34) differs from that of the others.

11. Wavelength selective switch according to claim 6, characterized in that each Mach Zehnder waveguide (31, 32, 33, 34) comprises N phase control elements (51, 553, 55, 57) and N−1 Bragg gratings (62, 64, 66).

12. Wavelength selective switch according to claim 11, characterized in that the Mach Zehnder waveguides (31, 32, 33, 34) are of identical length.

13. Wavelength selective switch according to claim 11, characterized in that the length of at least one Mach Zehnder waveguide (31, 32, 33, 34) differs from that of the others.

14. Wavelength selective switch according to claim 12, characterized in that the phase control elements (51, 53, 55, 57) arranged on the Mach Zehnder waveguides (31, 32, 33, 34) are equivalent.

15. Method for switching optical wavelength channels in an optical network, characterized by the following steps:

said optical wavelength channels are excited onto an access waveguide arranged on a first MMI waveguide;

the optical wavelength channels are transmitted through said first MMI waveguides and depicted on at least one Mach Zehnder waveguide arranged on the opposite side relative to said access waveguide, the optical wavelength channels are transmitted through the Mach Zehnder waveguides, the phase of at least one of the optical wavelength channels is changed by a phase control element arranged in a Mach Zehnder waveguide, and at least one optical wavelength channel is reflected by at least one Bragg grating arranged in a Mach Zehnder waveguide.

16. Method according to claim 15, characterized in that at least one wavelength channel is transmitted through said Bragg gratings and phase control elements arranged in a Mach Zehnder waveguide to reach a second MMI waveguide, and that said transmitted wavelength channel is excited from at least one access waveguide arranged on the second MMI waveguide.

17. Method according to claim 16, characterized in that the phase control elements control to which access waveguide on the first and the second MMI waveguide respectively, the wavelength channels are transmitted.

18. Method according to claim 17, characterized in that the wavelength channels not reflected in a Bragg grating are compensated in at least one of the following phase control elements in relation to said Bragg grating for distortion caused by at least one phase control element before said Bragg grating.

19. Method according to claim 17, characterized in that the wavelength channels not reflected in a Bragg grating are software compensated for distortion caused by at least one phase control element by software means.

20. Method according to claim 18, characterized in that the wavelength channels not reflected in a Bragg grating will be excited out from the same access waveguide arranged on the second MMI waveguide, when the length of the Mach Zehnder waveguides are the same, when the phase control elements arranged on the equivalent position in relation to the relevant Bragg grating in the Mach Zehnder wavelengths are equivalent and when the dimension and structure of said second MMI waveguides have been chosen correctly.

21. Method according to claim 18, characterized in that the wavelength channels not reflected in a Bragg grating will be excited onto different access waveguides arranged on the second MMI waveguide, when the length of the Mach Zehnder waveguides differs, when the phase control elements arranged in the equivalent position in relation to the relevant Bragg grating in the Mach Zehnder waveguides are equivalent and when the dimension and structure of said second MMI waveguide has been chosen correctly.

* * * * *